(12) United States Patent
Yoon et al.

(10) Patent No.: US 7,769,414 B2
(45) Date of Patent: Aug. 3, 2010

(54) SYSTEM AND METHOD FOR CONTROLLING POWER SAVING MODE IN WIRELESS PORTABLE NETWORK SYSTEM

(75) Inventors: Chul-Sik Yoon, Daejeon (KR); Soon-Yong Lim, Daejeon (KR); Jae-Heung Kim, Daejeon (KR); Kun-Min Yeo, Daejeon (KR); Byung-Han Ryu, Daejeon (KR); Seung-Ku Hwang, Seoul (KR)

(73) Assignees: Electronics and Telecommunications Research Institute, Daejeon (KR); KT Corporation, Seongnam, Kyungki-Do (KR); Samsung Electronics Co., Ltd., Suwon-Si, Gyeonggi-Do (KR); Hanaro Telecom, Inc., Seoul (KR); SK Telecom Co., Ltd., Seoul (KR)

( * ) Notice: Subject to any disclaimer, the term of this patent is extended or adjusted under 35 U.S.C. 154(b) by 863 days.

(21) Appl. No.: 10/565,008

(22) PCT Filed: Jul. 16, 2004

(86) PCT No.: PCT/KR2004/001780

§ 371 (c)(1),
(2), (4) Date: Jan. 23, 2007

(87) PCT Pub. No.: WO2005/008359

PCT Pub. Date: Jan. 27, 2005

(65) Prior Publication Data

US 2008/0043656 A1    Feb. 21, 2008

(30) Foreign Application Priority Data

Jul. 18, 2003    (KR)    ...................... 10-2003-0049116
Apr. 12, 2004    (KR)    ...................... 10-2004-0024862

(51) Int. Cl.
*H04M 1/00*     (2006.01)
(52) U.S. Cl. ............... 455/574; 455/550.1; 455/127.5; 370/311
(58) Field of Classification Search ............... 455/574; 370/311, 336
See application file for complete search history.

(56) References Cited

U.S. PATENT DOCUMENTS 5,539,748 A * 7/1996 Raith .................. 370/329

(Continued)

OTHER PUBLICATIONS

Jin et al.; "Optimal Threshold Energy Level of Energy Efficient MAC for Energy-limited Ad-hoc Networks"; IEEE; 2001; pp. 2932-2936.
Woesner et al.; "Power-Saving Mechanisms in Emerging Standards for Wireless LANs: The MAC Level Perspective"; IEEE; Jun. 1998; pp. 40-48.
International Search Report for PCT/KR2004/001780.

*Primary Examiner*—Nick Corsaro
*Assistant Examiner*—Isaak R Jama
(74) *Attorney, Agent, or Firm*—Lowe Hauptman Ham & Berner LLP

(57) ABSTRACT

Disclosed is a power saving mode control system (200) and method in a wireless portable Internet system. Stations in the sleep mode are grouped by aligning listening intervals of the stations which enter the sleep mode in the power saving management system wherein the sleep interval for receiving no traffic data is exponentially increased. Therefore, the sleep mode of the grouped subscriber stations are easily managed, and power saving efficiency is enhanced and system complexity is lowered by easily and quickly detecting data states provided to the corresponding stations.

15 Claims, 14 Drawing Sheets

U.S. PATENT DOCUMENTS

| | | | |
|---|---|---|---|
| 5,625,882 A | 4/1997 | Vook et al. | |
| 6,438,375 B1 | 8/2002 | Muller | |
| 6,463,307 B1 * | 10/2002 | Larsson et al. | 455/574 |
| 6,473,607 B1 * | 10/2002 | Shohara et al. | 455/343.1 |
| 6,622,251 B1 | 9/2003 | Lindskog et al. | |
| 6,765,893 B1 * | 7/2004 | Bayley | 370/335 |
| 6,804,542 B1 * | 10/2004 | Haartsen | 455/574 |
| 6,856,603 B1 * | 2/2005 | Vollmer et al. | 370/311 |
| 6,937,578 B1 * | 8/2005 | Hunzinger | 370/311 |
| 6,999,799 B1 * | 2/2006 | Almassy | 455/574 |
| 7,111,158 B1 * | 9/2006 | Burroughs et al. | 713/1 |
| 7,260,068 B2 * | 8/2007 | Hsieh et al. | 370/311 |
| 7,430,421 B2 * | 9/2008 | Park | 455/456.1 |
| 7,450,926 B2 * | 11/2008 | Chang et al. | 455/343.4 |

\* cited by examiner

SYSTEM AND METHOD FOR CONTROLLING POWER SAVING MODE IN WIRELESS PORTABLE NETWORK SYSTEM

CROSS REFERENCE TO RELATED APPLICATION

This application is the National Phase application of International Application No. PCT/KR2004/001780, filed Jul. 16, 2004, which designates the United States and was published in English. This application, in its entirety, is incorporated herein by reference.

TECHNICAL FIELD

The present invention relates to a system and method for controlling a power saving mode of a subscriber station in a wireless portable network system. More specifically, the present invention relates to a system and method for managing a sleep mode in a unified manner and reducing power by grouping and controlling a sleep operation, a listening operation, and an awake operation for saving power of a subscriber station in a wireless portable network system.

BACKGROUND ART

A wireless portable Internet is a next generation communication scheme for further supporting mobility for short range data communication schemes which use fixed access points, such as the conventional wireless LAN.

Various standards for the wireless portable Internet have been proposed, and the international standard of the portable Internet has progressed by focusing on the IEEE 802.16e.

FIG. 1 shows a brief diagram of the wireless portable Internet.

A wireless portable Internet system comprises an SS (subscriber station) 10, base stations 20 and 21 for performing wireless communication with the SS 10, routers 30 and 31 connected to the base stations through a gateway, and the Internet.

The wireless LAN such as the conventional IEEE 802.11 provides a data communication scheme for allowing short-range wireless communication with reference to a fixed access point, and it does not provide mobility of the SS but rather it supports the short-range data communication in a wireless manner instead of on the cable basis.

The wireless portable Internet system driven by the IEEE 802.16 group guarantees mobility and provides a seamless data communication service when the SS 10 shown in FIG. 1 is moved to a cell managed by the base station 21 from another cell managed by the base station 20.

The IEEE 802.16 basically supports the MAN (metropolitan area network), and represents an information communication network covering an intermediate area of between the LAN and the WAN.

Therefore, the wireless portable Internet system supports a handover of the SS 10 in a like manner of the mobile communication service, and assigns dynamic IP addresses according to movement of the SS.

In this instance, the SS communicates with the base stations 20 and 21 through the OFDMA (orthogonal frequency division multiple access) method, which is a modulation and multiple access scheme having combined the OFDM (orthogonal frequency division multiplexing) scheme which uses a plurality of subcarriers of orthogonal frequencies as a plurality of subchannels, and the FDMA (frequency division multiple access) scheme. The OFDMA scheme is essentially resistant to the fading phenomenon generated on the multi-paths, and has high data rates.

Also, the IEEE 802.16 has adopted the AMC (adaptive modulation and coding) scheme for adaptively selecting a modulation and coding scheme according to a request and an acceptance between the SS 10 and the base stations 20 and 21.

FIG. 2 shows a hierarchical structure of the wireless portable Internet system.

The hierarchical structure of the wireless portable Internet system of the IEEE 802.16e is generally classified as a physical layer L10, and an MAC (media access control) layer L21, L22, and L23.

The physical layer L10 performs wireless communication functions executed on the conventional physical layers, such as modulation/demodulation, and encoding/decoding.

The wireless portable Internet system does not have layers classified according to their functions, but allows a single MAC layer to perform various functions, differing from the mobile cellular system.

Regarding sublayers according to the functions, the MAC layer comprises a privacy sublayer L21, an MAC common part sublayer L22, and a service specific convergence sublayer L23.

The service specific convergence sublayer L23 performs a payload header suppression function and a QoS mapping function in the case of consecutive data communication.

The MAC common part sublayer L22, which is the core part of the MAC layer, performs a system access function, a bandwidth allocation function, a connection establishment and maintenance function, and a QoS management function.

The privacy sublayer L21 performs a device authentication function, a security key exchange function, and a data encryption function. Device authentication is performed by the privacy sublayer L21, and user authentication is performed by an upper layer (not illustrated) of the MAC FIG. 3 shows a brief diagram of a connection configuration between a BS (base station) and an SS in the wireless portable Internet system.

The MAC layer of the SS and the MAC layer of the BS have a connection C1 therebetween.

The phrase connection C1 in the present invention represents not a physically connected relation but rather a logically connected relation, and it is defined to be a mapping relation between MAC peers of the SS and the BS in order to transmit traffic of a single service flow.

Therefore, parameters or messages defined with respect to the connection C1 represent the functions between the MAC peers, and in reality, the parameters or the messages are processed, are converted into frames, and are transmitted through the physical layers, and the frames are parsed and the functions which correspond to the parameters or the messages are executed on the MAC layer.

The MAC messages transmitted through the connection C1 basically comprise a CID (connection identifier) which is an MAC layer address for identifying connections; an MAP for defining a symbol offset and a subchannel offset of bursts time-divided by the SS in a downlink/uplink, and a number of symbols and a number of subchannels of allocated resources; and a channel descriptor for describing characteristics of the physical layer according to the characteristics of the downlink/uplink (a downlink channel descriptor will be referred to as a DCD and an uplink channel descriptor will be referred to as a UCD hereinafter).

In addition, the MAC messages comprise various messages for performing a request (REQ) function, a response (RSP) function, and an acknowledgement (ACK) function on various operations.

FIG. 4 shows a diagram for a frame structure of the wireless portable Internet system.

Frames are classified as a downlink sub-frame F1 and an uplink sub-frame F2 depending on transmission directions. The vertical axis of the frame represents subchannels including orthogonal frequencies, and the horizontal axis denotes a time-divided symbol axis.

The downlink sub-frame F1 comprises a preamble, a downlink MAP, an uplink MAP, and a plurality of downlink bursts. The downlink bursts may not represent the channels or resources classified according to users, but they are classified according to transmission levels with the same modulation scheme or channel encoding.

Therefore, the downlink MAP has offset information, modulation method information, and coding information on a plurality of users who use the same modulation method and channel coding, and allocates the resources to the users. Accordingly, the MAP has a feature of broadcast channels and requires strong robustness.

In the case of the uplink sub-frame F2, transmission is performed per user, and the uplink bursts have per-user information.

FIG. 5 shows a flowchart for establishing a connection process in the wireless portable Internet system.

When an SS enters a base station's area in step S1, the SS establishes downlink synchronization with the BS in step S2. When the downlink synchronization is established, the SS acquires an uplink parameter in step S3. For example, the parameter includes a channel descriptor message according to the physical layer characteristics (e.g., useable burst profiles corresponding to the appropriate SNR (signal to noise ratio) levels).

A ranging process between the SS and the base station is performed in step S4. The ranging process for correcting timing, power, and frequency information between the SS and the base station performs an initial ranging process and a periodic ranging process after the initial ranging.

When the ranging process is finished, a negotiation on basic capabilities for establishing connection between the SS and the base station is performed in step S5. When the negotiation on basic capabilities is finished, the SS is authenticated in step S6 by using a device identifier including an MAC address and a certificate of the SS to the base station.

When the authentication for the SS is finished and a authorization on the wireless portable Internet is confirmed, a device address of the SS is registered in step S7, and an IP address is provided to the SS from an IP address management system such as a DHCP or a Mobile IP and an IP connection is accordingly established in step S8.

The SS assigned with the IP address performs a connection-establishment process for data transmission in step S9.

The above-described wireless portable Internet system not only performs communication near a fixed location but also has mobility in the metropolitan level differing from the conventional wireless LAN communication systems, and hence, batteries are usually used to supply power to the SS. Therefore, the duration of the batteries is a major limitation of the usage time in the wireless portable Internet system.

Therefore, the wireless portable Internet system such as the IEEE 802.16e has proposed a sleep mode for reduction of battery power consumption. The sleep mode is a method for allowing a terminal to enter a sleep state during a sleep interval, and reduce the SS's power consumption when no data to be transmitted to the SS is provided. After entering the sleep state, the SS performs no operation for data transmission during the sleep interval.

The SS is switched to a listening state each time the sleep interval is terminated, and it checks whether data which stands by to be transmitted (to the corresponding terminal) during the sleep interval are provided.

FIG. 6 shows a signal flowchart for a sleep mode operation in the wireless portable Internet system.

Entering the sleep mode by the SS requires a permission by the base station. The SS 10 which attempts to enter the sleep mode establishes a sleep interval to request a sleep mode from the base station 20 in step S10.

When receiving the sleep mode request, the base station assigns a sleep interval to transmit a sloop mode approval to the SS in step S11.

When receiving the sleep mode approval, the SS enters the sleep mode for receiving no data at the sleep mode entering time M in step S12. When the initial sleep interval is passed, the SS is switches to a listening mode to check whether data addressed to the SS (in a transmission standby state) are buffered from the base station during the sleep interval in step S13.

In this instance, when no data addressed to the SS (in the transmission standby state) are buffered during the initial sleep interval, the base station 20 establishes a message for notifying existence of data traffic to be "0" and transmits it to the SS in step S14.

When it is determined that no data traffic is transmitted during the listening mode, the SS enters the sleep mode again in step S15. In this instance, the sleep interval can be established to be equal to or greater than the initial sleep mode.

When data in the transmission standby state with respect to the SS 10 are provided during a second sleep interval, the base station can buffer the data traffic in step S17, and existence of the buffered data are reported in the listening mode of the SS in step S18.

When checking that the data traffic to be transmitted to the SS 10 are found in the listening mode step S16, the SS 10 terminates the sleep mode, enters an awake mode to receive the buffered data traffic, and performs data communication with the base station 20.

The SS 10 proceeds to the sleep mode according to the sleep mode operation when there are no data to be transmitted, thereby preventing unnecessary power consumption.

FIGS. 7 and 8 show exemplified sleep intervals in the sleep mode.

FIG. 7 shows exemplified terminals operable by a power saving operation mode with a periodic sleep mode wherein a subscriber station SS1 listens to a frame once for each N/4 frame, and a subscriber station SS2 listens to a frame once for each N/2 frame.

Therefore, broadcast information which is needed to be listened to by the subscriber states SS1 and SS2 is broadcast once for each N/2 frame, and information which is needed to be transmitted for a specific subscriber station SS1 is broadcast by a subframe with a period of an N/4 frame.

However, the periodic power saving mode is easy to manage, but its power saving efficiency is not good because most of the data traffic is shown at a specific time (i.e., a burst characteristic), and periodic switching to the listening mode is inefficient for power saving in the data communication system such as the Internet.

FIG. 8 shows a power saving mode operation with an exponentially increasing sleep interval.

Since the data traffic other than voice traffic has a burst characteristic and a long-range dependence as described above, it is desirable to exponentially increase the next sleep interval when no data traffic in the transmission standby is provided in the listening mode.

As described, a subscriber station SS3 initially has a sleep interval of an N frame, and it exponentially increases the sleep interval such as to 2N, 4N, and 8N.

However, the case of exponentially increasing the sleep interval is effective when the data traffic has a long-range dependence, but it increases complexity of the system since it must manage the sleep interval and the listening interval for the respective subscriber stations.

Also, the power saving operation method shown in FIG. 8 is not efficient for traffic which has a very long interval and periodically appears.

DISCLOSURE OF INVENTION

Technical Solution

It is an advantage of the present invention to provide a control system and method for effectively supporting power saving on traffic with long-range dependence and power saving on periodic traffic.

It is another advantage of the present invention to provide a control system and method for providing effective power saving, grouping management of respective subscriber stations, and totally managing them to thereby reduce system complexity and provide ease of management.

It is still another advantage of the present invention to provide a power saving mode control system and method for allowing a plurality of subscriber stations to quickly detect a state in which no data traffic is transmitted, and maintain a sleep state.

In one aspect of the present invention, a power saving mode control system of a base station in a wireless portable network system comprises: a message receiver for receiving a sleep mode request message from the subscriber station; a message parser for parsing the sleep mode request message and extracting a minimum sleep interval, a maximum sleep interval, and a subscriber station identifier; a grouping controller for determining a sleep mode enter time of the subscriber station which has requested the sleep mode based on the minimum sleep interval and the maximum sleep interval in order to group listening intervals of a plurality of subscriber stations and align them; a memory for storing sleep mode information on the grouped subscriber stations; and a message transmitter for reporting the minimum sleep interval, the maximum sleep interval, and the sleep mode enter time to the subscriber station which has requested the sleep mode.

In another aspect of the present invention, a power saving mode control method in a wireless portable network system, comprises: receiving a sleep mode request message from a subscriber station; determining a minimum sleep interval and a maximum sleep interval of the subscriber station; determining a sleep mode enter time based on the minimum sleep interval and the maximum sleep interval so that the listening interval of the subscriber station which has requested the sleep mode may be aligned and grouped with listening intervals of other subscriber stations; and transmitting a sleep mode reply message including the minimum sleep interval, the maximum sleep interval, and the sleep mode enter time.

In still another aspect of the present invention, a method for saving power of a subscriber station in a wireless portable network system, comprises: switching the mode of the subscriber station to a sleep mode for receiving no traffic; exponentially increasing a sleep interval during the sleep mode; maintaining the sleep interval during a predefined maximum sleep interval when the sleep interval reaches the predefined maximum sleep interval; aligning and grouping the listening intervals wherein the respective sleep intervals of a plurality of subscriber stations are terminated; and checking whether traffic is transmitted to the listening interval of the grouped subscriber stations during the sleep interval.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

Figure 1:
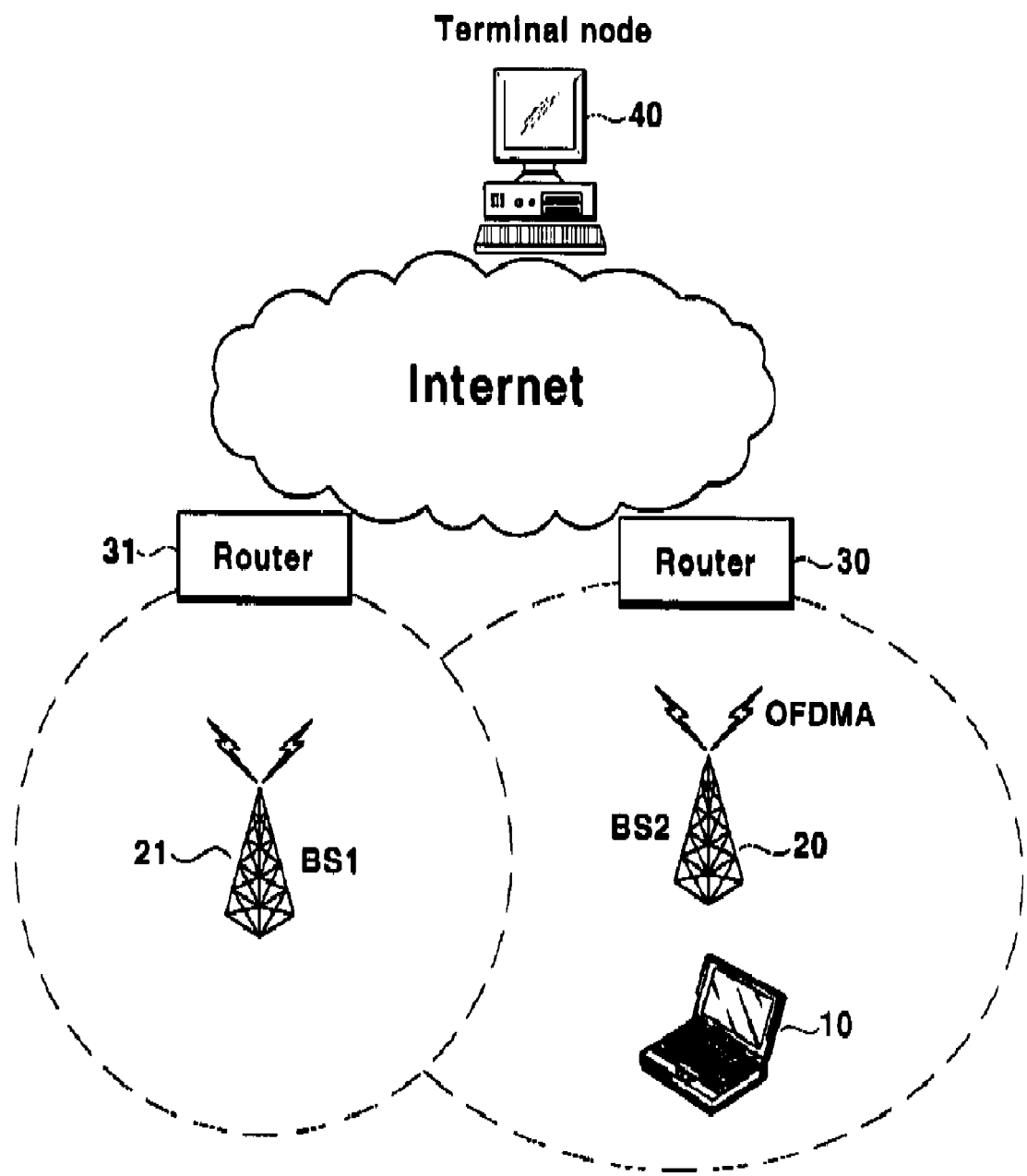
FIG. 1 shows a brief diagram of the wireless portable Internet.
Figure 2:
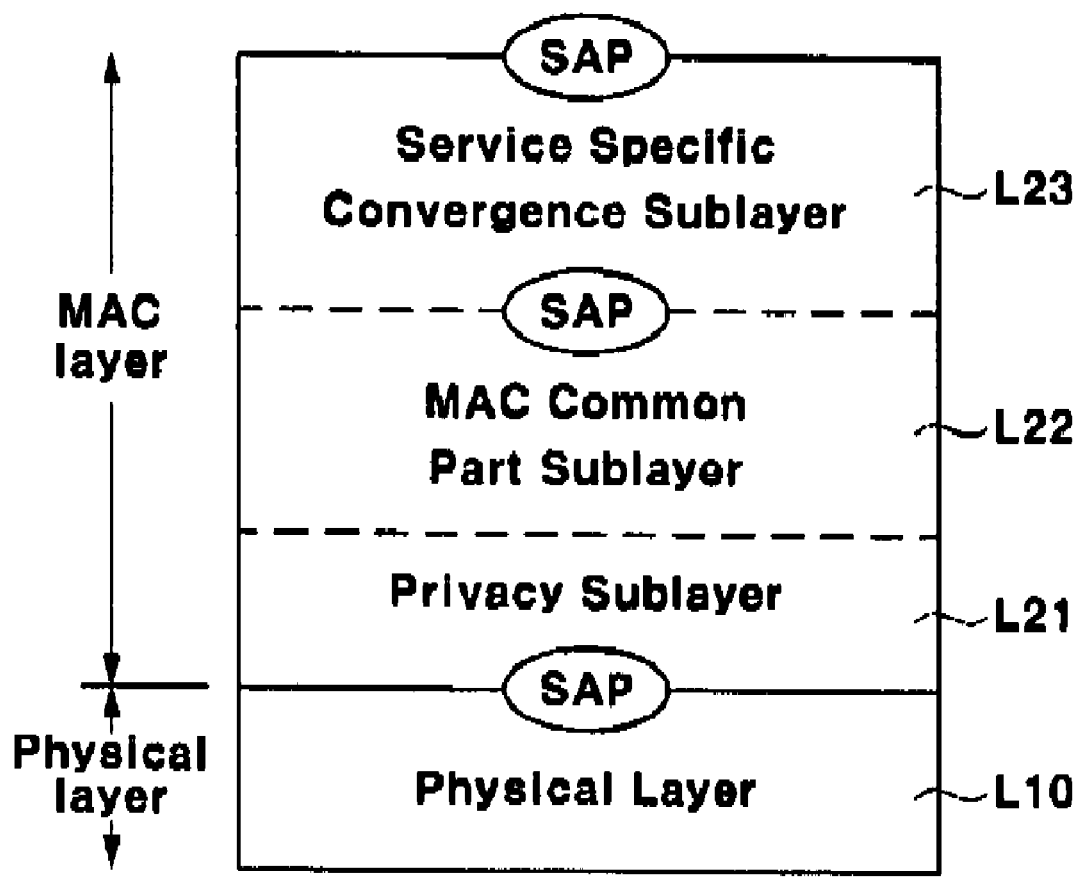
FIG. 2 shows a hierarchical structure of the wireless portable Internet system.
Figure 3:
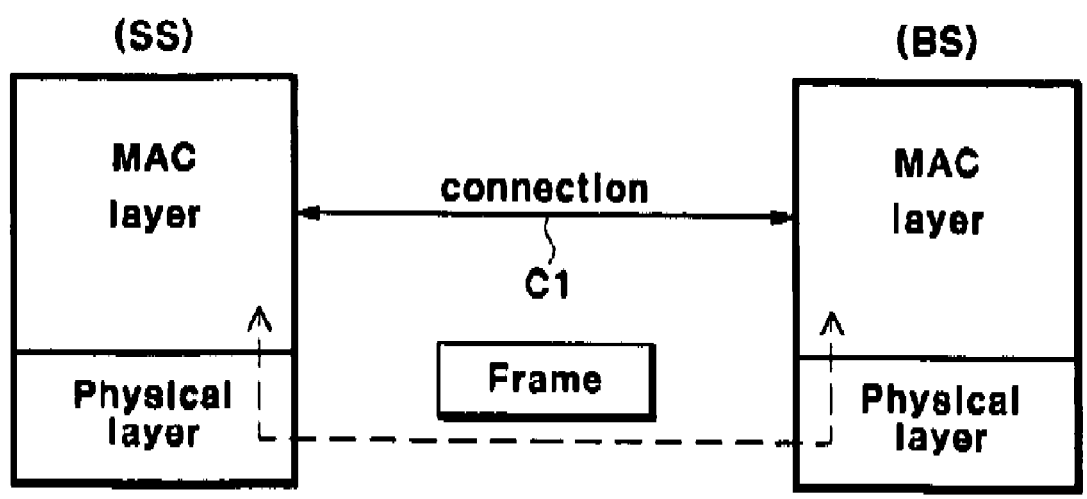
FIG. 3 shows a brief diagram of a connection configuration between a base station and an SS in the wireless portable Internet system.
Figure 4:
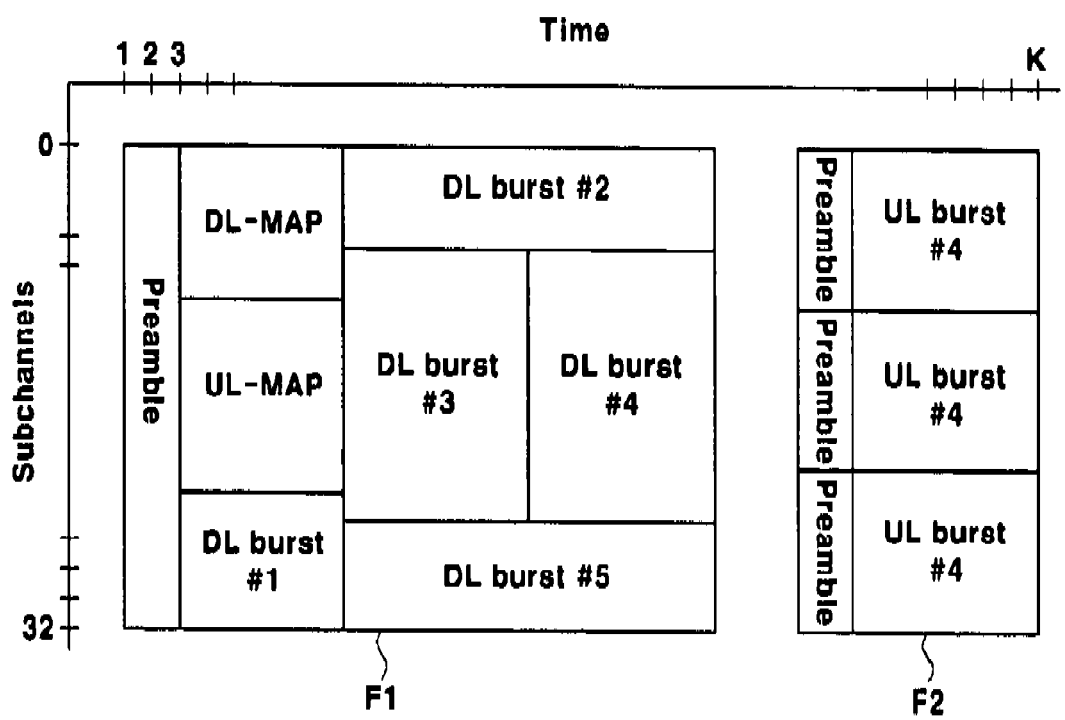
FIG. 4 shows a diagram for a frame structure of the wireless portable Internet system.
Figure 5:
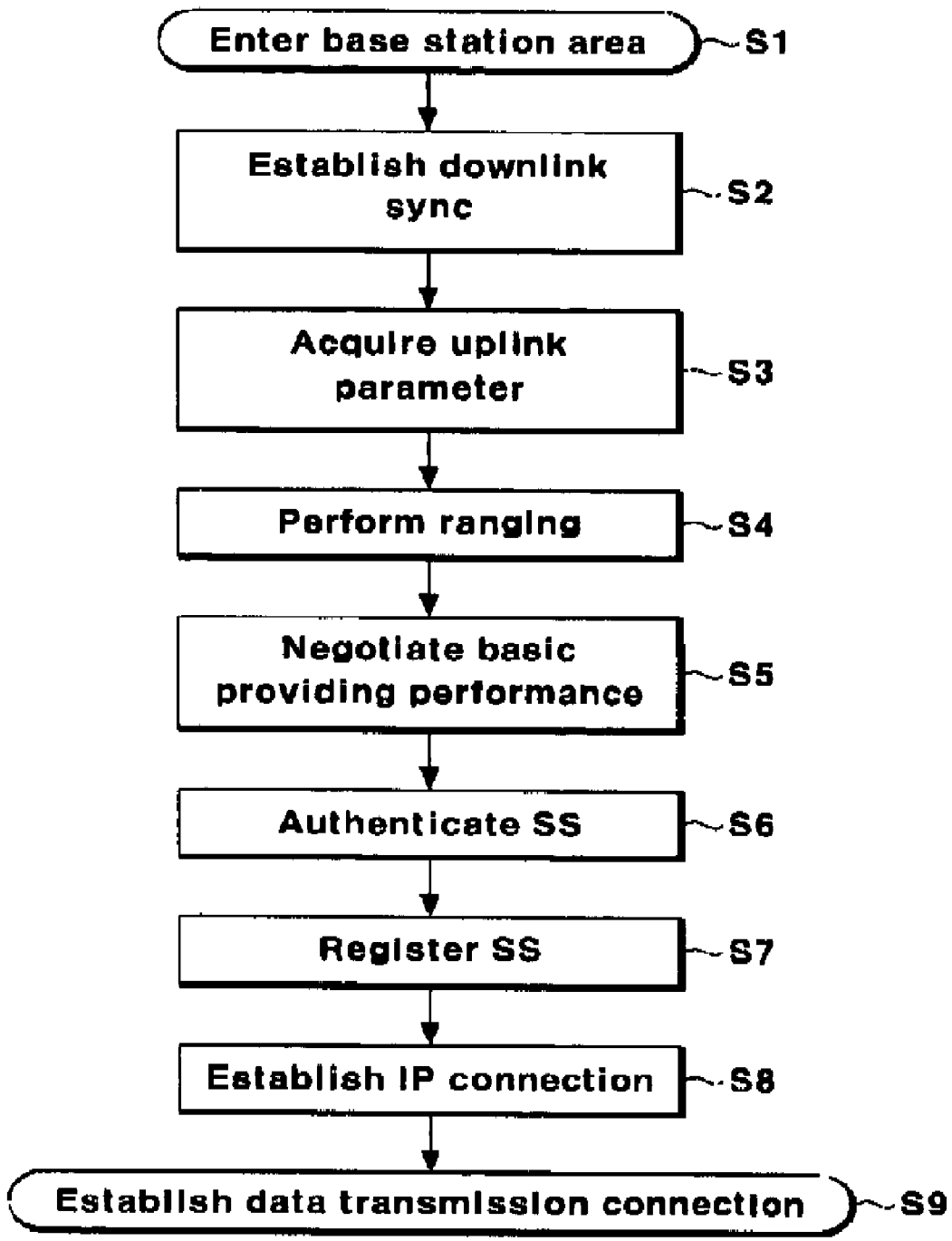
FIG. 5 shows a flowchart for establishing a connection process in the wireless portable Internet system.
Figure 6:
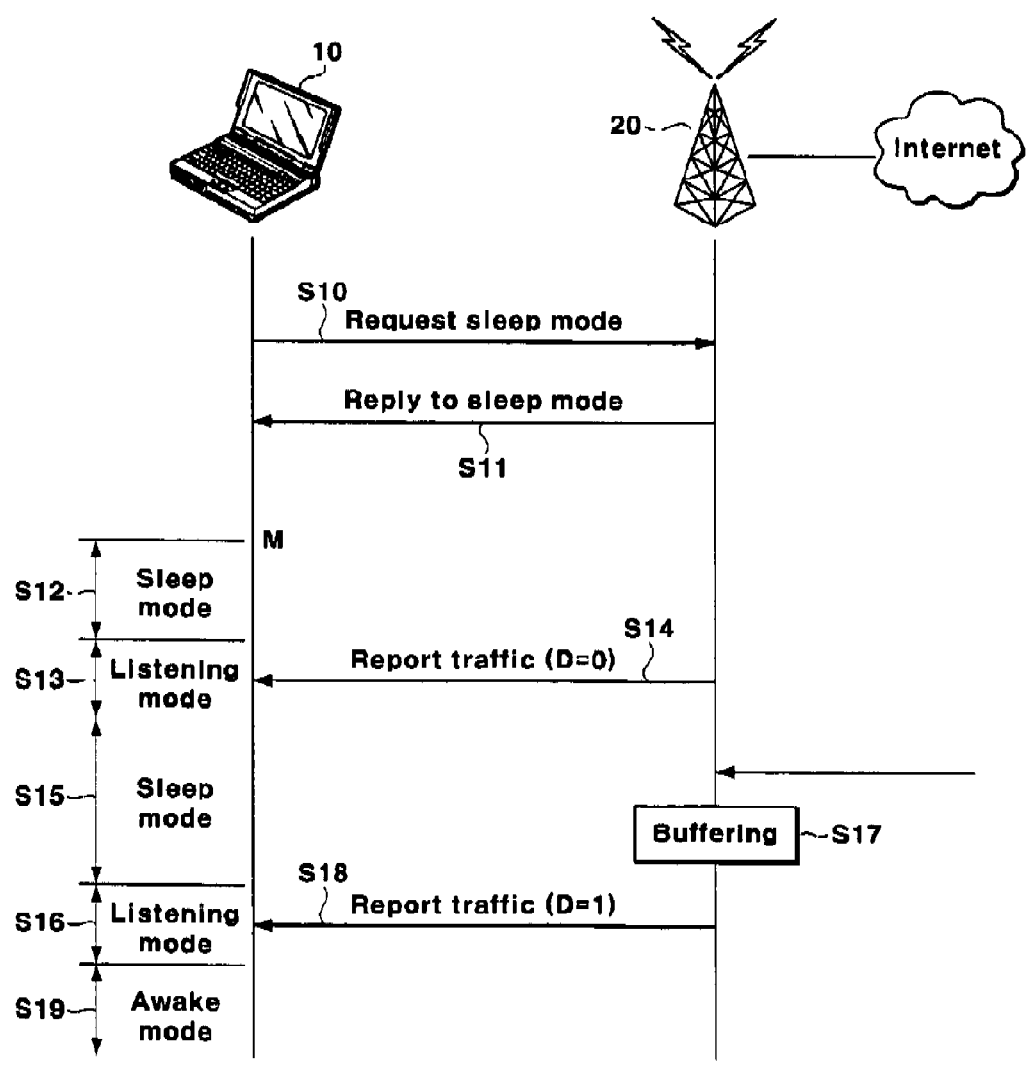
FIG. 6 shows a signal flowchart for a sleep mode operation in the wireless portable Internet system.
Figure 7:
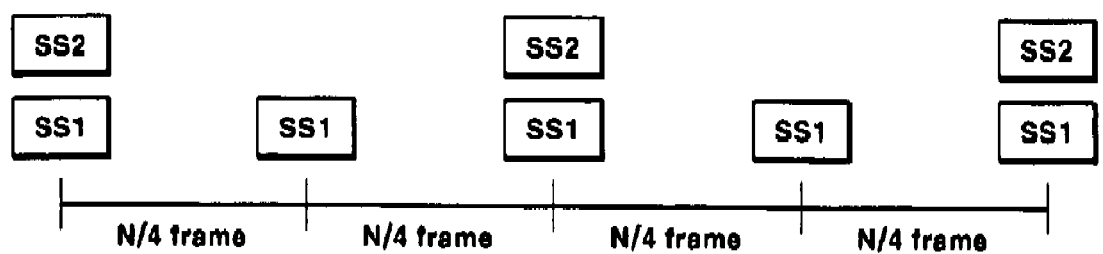
FIGS. 7 and 8 show exemplified sleep intervals in the sleep mode.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

To clarify the present invention, parts which are not described in the specification are omitted. Similar parts throughout the specification have the same reference numerals.

A power saving mode system and a power saving mode control method according to a preferred embodiment of the present invention will be described with reference to drawings.

Figure 9:
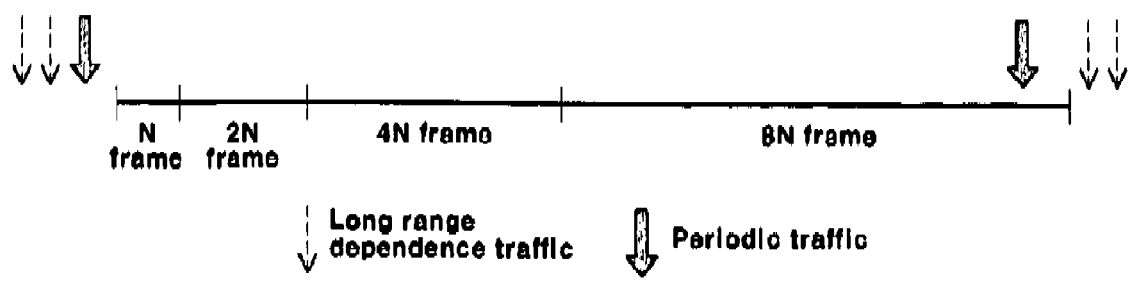
FIG. 9 shows a power saving mode according to a preferred embodiment of the present invention.

FIG. 9 shows a power saving mode according to a preferred embodiment of the present invention in which the dotted arrows represent traffic with a long-range dependence, and thick arrows indicate fixed periodic traffic with a long interval.

It is controlled in the preferred embodiment such that the sleep interval is exponentially increased and the maximum value of the sleep mode corresponds to the interval of the periodic traffic. That is, when the interval of a predictable periodic traffic is 16N frames, the sleep interval of the SS is exponentially increased by N, 2N, 4N, and 8N frames, and it then has a periodic sleep interval of 16N frames. Therefore, the power saving effect is maximized in the SS for receiving the periodic traffic and the SS having a long-range dependence.

That is, the SS for receiving the periodic traffic exponentially increases the sleep mode to the traffic interval to reduce the number of times it is switched to the listening mode, and the SS subsequently matches the maximum sleep interval with the traffic interval so that the SS may effectively process the periodic traffic.

Also, since a plurality of subscriber stations are grouped to check traffic transmission states by matching the maximum sleep interval with the traffic interval, the complexity of the system of the base station is reduced, and the load of the operation by the system is decreased.

Figure 8:
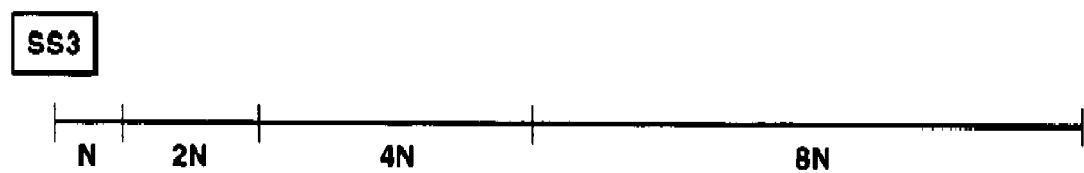

A process for aligning the sleep interval is needed in order to effectively use the preferred embodiment shown in FIG. 8. The reason for this is that the base station must check data states for the respective stations and perform an operation for updating the sleep interval for each frame when the times, the sleep intervals, and the listening intervals for the subscriber stations to enter the sleep mode are different.

Therefore, a method for grouping the subscriber stations will now be described in the preferred embodiment.

Figure 10:
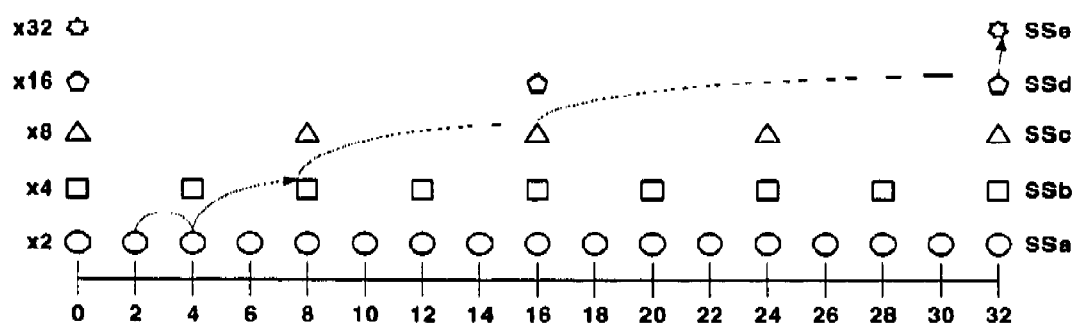
FIG. 10 shows a method for aligning listening intervals of a subscriber station according to a preferred embodiment of the present invention.

FIG. 10 shows a method for aligning listening intervals of a subscriber station according to a preferred embodiment of the present invention.

In order to group the subscriber stations, the base station specifies and notifies a sleep mode entering time. The base station provides information on the minimum sleep interval N1, the maximum sleep interval N2, and the sleep mode entering time m to the SS which has requested a sleep mode.

In this instance, when the subscriber station SSa has two frames of the minimum sleep interval N1 and the maximum sleep interval align window size WinMax managed by the system is sixteen frames, the entering time is determined by controlling the remainder of division of the frame number by the maximum sleep interval N2 to be N1 in order to align the subscriber stations.

That is, when entering the sleep mode in the $2^{nd}$ frame, the $18^{th}$ frame, and the $26^{th}$ frame, the subscriber station SSa can align the listening interval with other subscriber stations having periodic listening modes. FIG. 9 shows that the listening interval of the subscriber station SSa is aligned with the listening intervals of other subscriber stations and they can be grouped in the $8^{th}$ frame, the $16^{th}$ frame, and the $32^{nd}$ frame when the $2^{nd}$ frame is established to be a sleep mode enter time.

Since the subscriber station SSa can be grouped with other subscriber stations at a specific interval, the base station can group a plurality of subscriber stations and check transmission states of the data traffic. Therefore, the base station updates the groups which have no traffic transmission at one time, thereby substantially reducing the management load of the base station.

Since the power saving mode is controlled by grouping the subscriber stations, the base station can indicate traffic on the corresponding group in a flag format in advance of time in a layer (e.g., a physical layer) lower than the MAC layer. When perceiving that no traffic is provided from the traffic indication message of the lower layer, the subscriber station stops a check process on unnecessary messages and immediately enters the sleep mode to thus further save the power.

Figure 11:
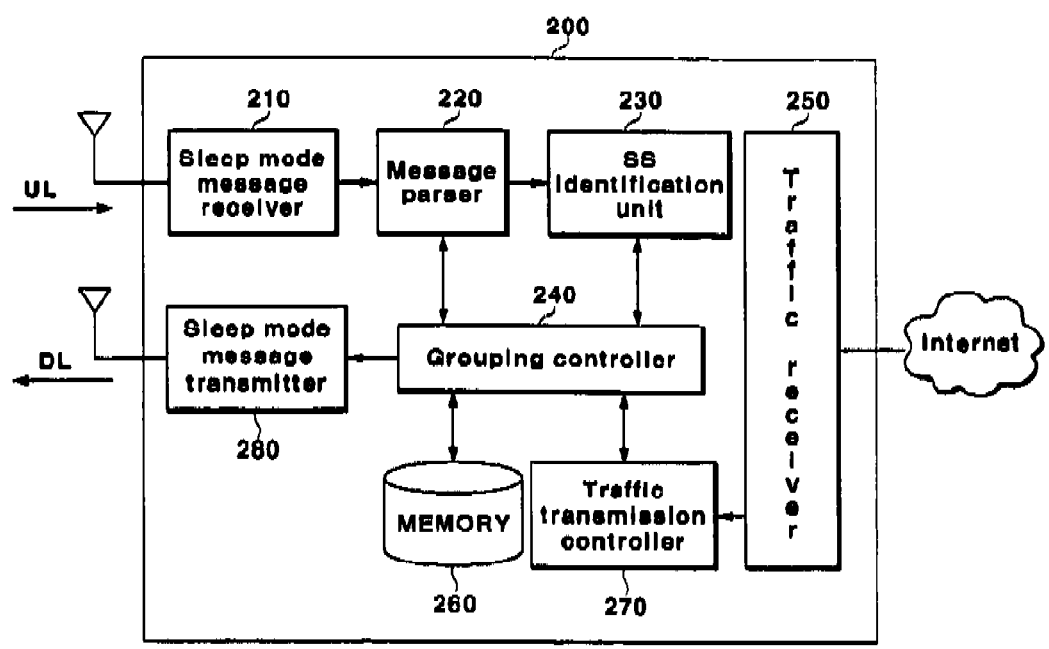
FIG. 11 shows a block diagram for a power saving mode control system according to a preferred embodiment of the present invention.

FIG. 11 shows a block diagram for a power saving mode control system according to a preferred embodiment of the present invention.

The power saving mode control system 200 can be realized to the base stations which manage subscriber stations, and can utilize components for managing power saving modes of the conventional wireless portable Internet system.

The power saving mode control system 200 comprises a (sleep mode) message receiver 210, a message parser 220, a subscriber station identification unit 230, a grouping controller 240, a traffic receiver 250, a memory 260, a traffic transmission controller 270, and a (sleep mode) message transmitter 280.

The (sleep mode) message receiver 210 receives a sleep mode request from a subscriber station. The sleep mode request uses an SLP-REQ message belonging to the MAC message, and comprises a minimum sleep interval N1 and a maximum sleep interval N2 requested by the subscriber station.

The message parser 220 parses the sleep mode request message, extracts values of a subscriber station identifier, a minimum sleep interval N1, and a maximum sleep interval N2, and transmits them to the grouping controller 240 and the subscriber station identification unit 230.

The subscriber station identification unit 230 parses the transmitted subscriber station identifier and transmits parsed results to the grouping controller 240.

The grouping controller 240 uses the minimum sleep interval N1, the maximum sleep interval N2, and the subscriber station identifier to control the subscriber station's sleep mode enter time. As described above, the sleep mode enter time is established by selecting the sleep mode entering frame to be the one in which the remainder of the frame number divided by the maximum sleep interval align window size WinMax to be the minimum sleep interval N1, and selecting the nearest frame number. The maximum sleep interval N2 can be updated according to the periodic traffic, which will be described later.

When the subscriber station is grouped with other subscriber stations by controlling the sleep mode enter time, the grouping information is temporarily stored in the memory 260.

The traffic information received through the traffic receiver 250 is buffered by the traffic transmission controller 270, and the interval of the traffic is calculated in the case of the periodic traffic. The calculated traffic interval is provided to the grouping controller 240 and is used for updating the maximum sleep interval N2.

The grouping controller 240 uses the interval of the periodic traffic, and updates the maximum sleep interval N2 to an updated maximum sleep interval N2 when it is needed to update the maximum sleep interval N2. As described above, it is desirable to allow the maximum sleep interval N2 to correspond to the interval of the periodic traffic.

When the maximum sleep interval N2 is updated, the entering time is controlled so that the remainder obtained by dividing the frame number by the maximum sleep interval align window size WinMax managed by the system may correspond to the minimum sleep interval N1, and a grouping process is performed.

When the minimum sleep interval N1, the maximum sleep interval N2' and the sleep mode enter time are determined by the grouping controller 240, the sleep mode message transmitter 280 transmits the MAC message (e.g., an SLP-RSP message) including the minimum sleep interval N1, the maximum sleep interval N2' and the sleep mode enter time to the subscriber station to reply to the sleep mode request.

Figure 12:
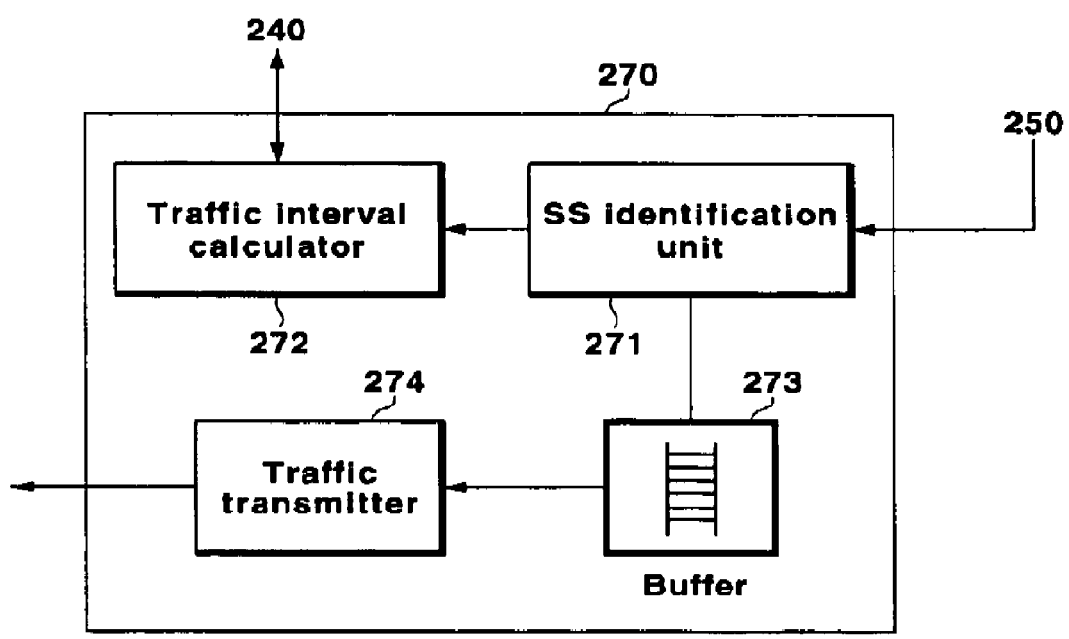
FIG. 12 shows a block diagram for a traffic transmission controller of a power saving mode control system according to a preferred embodiment of the present invention.

FIG. 12 shows a block diagram for the traffic transmission controller of the power saving mode control system according to the preferred embodiment of the present invention.

The traffic transmission controller 240 comprises a subscriber station identification unit 271, a buffer 273, a traffic interval calculator 272, and a traffic transmitter 274.

The traffic received at the traffic receiver 250 identifies the subscriber station to be transmitted from the subscriber station identification unit 271. When the identified subscriber station is in the sleep mode, the data traffic is temporarily stored in the buffer 273.

When the subscriber station is identified, the traffic interval calculator 272 determines whether the traffic on the identified subscriber station is periodic traffic, calculates the interval when it is found to be periodic traffic, and reports to the grouping controller 240. It is desirable for the periodic traffic to include data traffic and exclude voice traffic. Also, it is desirable to establish the minimum value of the traffic interval and use values which exceed the minimum value for the grouping process.

The traffic transmitter 274 transmits the traffic data stored in the buffer 273 to the subscriber station in the awake state by using a traffic transmission system (not illustrated).

Figure 13:
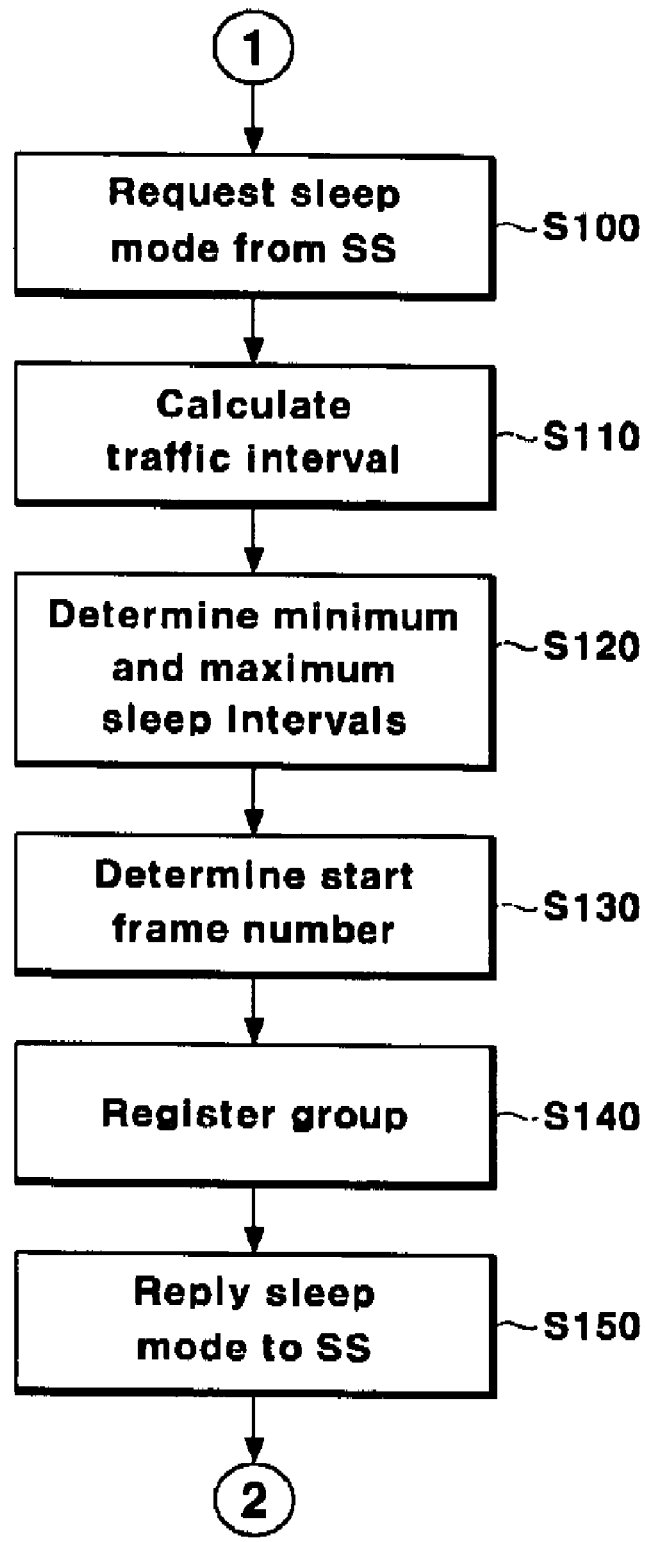
FIG. 13 shows a flowchart of a method for grouping power saving modes according to a preferred embodiment of the present invention.

FIG. 13 shows a flowchart of a method for grouping power saving modes according to a preferred embodiment of the present invention.

When receiving no data for a predetermined time, the subscriber station requests to enter a power-saving sleep mode from the base station in step S100 by transmitting the MAC message including the minimum sleep interval and the maximum sleep interval to the base station.

When a sleep mode request is provided from the subscriber station, the base station identifies the subscriber station and calculates the interval of the periodic traffic in step S110. The interval of the traffic includes an interval of the data traffic related to the subscriber station, and an interval of broadcast/multicast type periodic data traffic.

When the interval of the data traffic is calculated, the base station determines the minimum sleep interval N1 and the maximum sleep interval N2. It is desirable as described above to allow the maximum sleep interval N2 to correspond to the interval of the periodic traffic.

When the minimum sleep interval N1 and the maximum sleep interval N2 are determined, the sleep mode start frame number is determined in order to group the subscriber stations in step S130. In order to group the subscriber stations, the listening intervals are aligned to specific frame numbers. It is appropriate for the entering time of the sleep mode for aligning the listening interval to be a position where the remainder obtained by dividing the frame number by the maximum sleep interval align window size WinMax managed by the system becomes the minimum sleep interval.

The grouped subscriber stations are registered with respect to the specific frame number in step S140. The listening intervals of the subscriber stations do not correspond to each other, and the modes of the subscriber stations are switched to the listening modes at a time which corresponds to the specific frame number. Therefore, the grouping registration is possible by registering the subscriber stations, the mode of which is switched to the listening mode at the time which corresponds to the specific frame number.

When the grouping registration is finished, the base station replies to the sleep mode request by transmitting the MAC message including the determined minimum sleep interval, the maximum sleep interval, and the sleep mode start frame number to the subscriber station in step S150.

Figure 14:
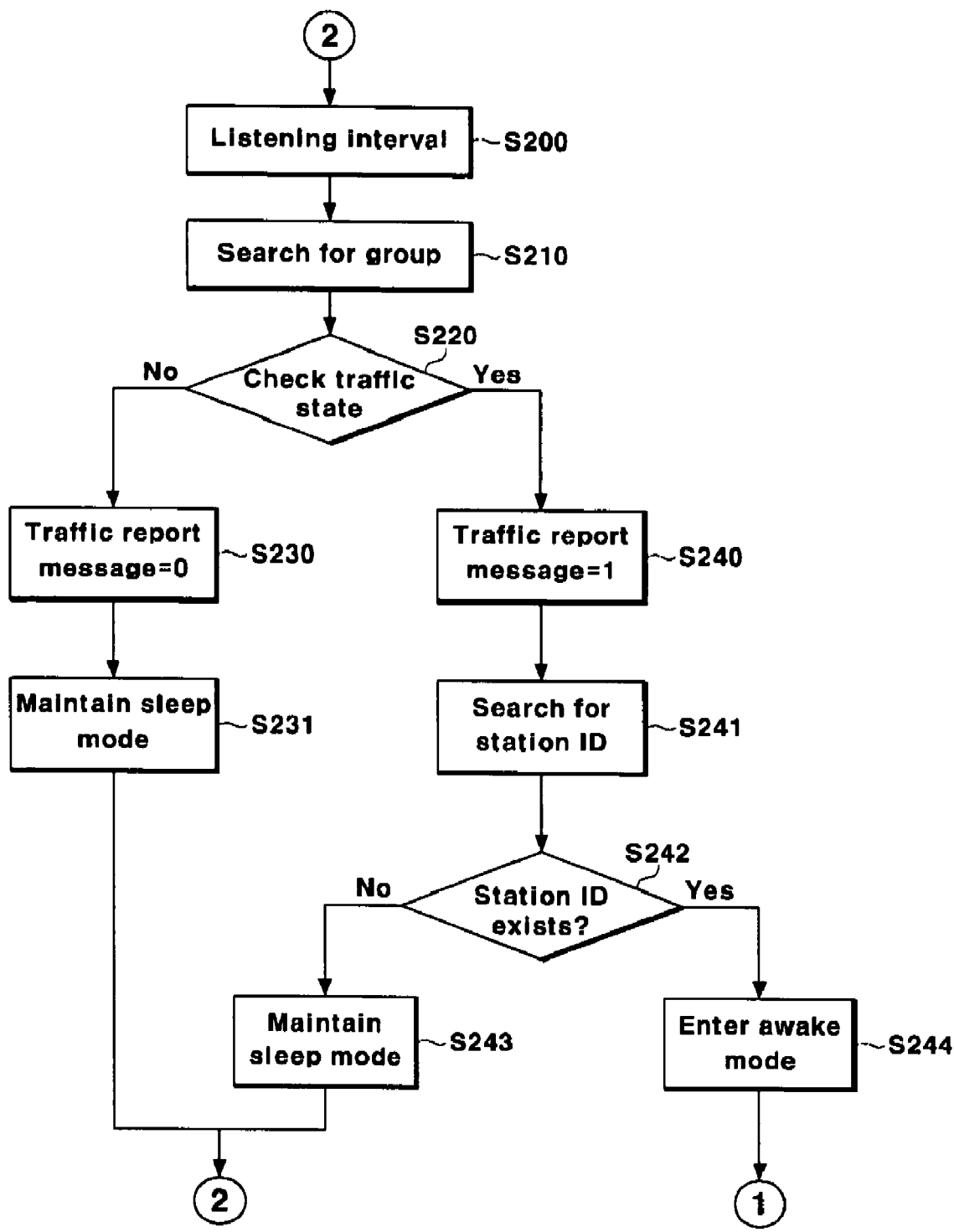
FIG. 14 shows a method for controlling power saving modes according to a preferred embodiment of the present invention.

FIG. 14 shows a method for controlling power saving modes according to a preferred embodiment of the present invention.

As shown, when the sleep mode request and reply are finished, the subscriber station enters the sleep interval. As described, the sleep interval exponentially increases, and becomes a periodic sleep interval when the sleep interval reaches the maximum sleep interval.

When the subscriber station reaches the listening interval in step S200, the base station searches for a group corresponding to the frame number corresponding to the listening interval in step S210, and checks whether traffic is transmitted to the subscriber station belonging to the group in step S220.

When there is no traffic to be transmitted to the subscriber stations belonging to the group, the sleep indicator of the traffic system broadcast channel message is established to be "0" and is transmitted to the group in step S230. It is desirable to use a physical layer message, which is checked in advance of time before the MAC layer message, for the traffic report message.

When the traffic report message is received and it is determined that no traffic is found to be transmitted, the subscriber station belonging to the group maintains the sleep mode and enters the sleep state during the subsequent sleep interval in step S231.

When there is traffic to be transmitted to the subscriber stations belonging to the group, the sleep indicator of the traffic system broadcast channel message is established to be "1" and is transmitted to the group in step S240. It is desirable to use a physical layer message, which is checked in advance of time before the MAC layer message, for the traffic report message.

When the traffic report message is transmitted to the group, the subscriber station belonging to the group searches for a station ID belonging to the traffic report message and checks whether any traffic is provided to the subscriber station in step S241 in a like manner of the general listening interval.

When the station ID is found in the traffic report message in step S242, the mode of the corresponding subscriber station is switched to the awake mode and receives data traffic in step S244.

When no station ID is found in the traffic report message, the subscriber station maintains the sleep mode and enters the sleep state during the subsequent sleep interval in step S243.

As described, the sleep interval is exponentially increased and it is periodically managed in the maximum sleep interval. In order to align the listening mode, the base station controls the subscriber station's sleep interval entering time.

The base station determines the listening interval as well as the minimum sleep interval, the maximum sleep interval, and the sleep mode, and reports it to the subscriber station in order to more easily align the listening intervals of the subscriber station belonging to the group.

Also, the base station can arrange the listening interval in the sleep interval. That is, the base station can use some frames of the sleep interval as the listening interval. When the listening interval is arranged in the sleep interval, the base station can more easily control the power saving mode of the subscriber station to align the sleep intervals because of reduced computational complexity.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

INDUSTRIAL APPLICABILITY

The power saving control system effectively reduces the power of the subscriber station in the case of traffic with the long-range dependence and the periodic traffic.

Further, the present invention groups management of the respective subscriber stations and controls them totally to thereby reduce the system complexity and provide easy management while providing effective power saving.

In addition, when there is no transmission of data traffic, a plurality of subscriber stations quickly detects this absence and maintains the sleep mode, thereby maximizing the power saving effect.

The invention claimed is:

1. A power saving mode control system of a base station in a wireless portable network system, comprising:
   a message receiver for receiving a sleep mode request message from the subscriber station;
   a message parser for parsing the sleep mode request message and extracting a minimum sleep interval, a maximum sleep interval, and a subscriber station identifier;
   a grouping controller for determining a sleep mode entering time of the subscriber station which has requested the sleep mode based on the minimum sleep interval and the maximum sleep interval in order to group listening intervals of a plurality of subscriber stations and align them;
   a memory for storing sleep mode information on the grouped subscriber stations; and
   a message transmitter for reporting the minimum sleep interval, the maximum sleep interval, and the sleep mode enter time to the subscriber station which has requested the sleep mode,
   wherein the grouping controller is configured to determine the sleep mode entering time to be a frame when a remainder obtained by dividing a frame number of said frame by a maximum sleep interval align window size managed by the system becomes the minimum sleep interval.

2. The power saving mode control system of claim 1, further comprising:
   a traffic receiver for receiving traffic from a network; and
   a traffic transmission controller for buffering the traffic up to the listening interval of a subscriber station which will receive the traffic, and transmitting the traffic.

3. The power saving mode control system of claim 2, wherein the traffic transmission controller comprises:
   a subscriber station identification unit for identifying the subscriber station which receives the traffic;
   a buffer for buffering the traffic up to the listening interval of a subscriber station;
   a traffic interval calculator for calculating a traffic transmission interval, corresponding it to the identified subscriber station, and transmitting the same to the grouping controller; and
   a traffic transmitter for transmitting the buffered traffic.

4. The power saving mode control system of claim 3, wherein the grouping controller updates the maximum sleep interval to correspond to the traffic transmission interval by using the traffic transmission interval transmitted by the traffic transmission controller.

5. The power saving mode control system of claim 3, wherein the grouping controller selects a time wherein the remainder obtained by dividing the frame number by the maximum sleep interval align window size managed by the system corresponds to the minimum sleep interval, and determines the sleep mode entering time.

6. The power saving mode control system of claim 3, wherein the grouping controller determines the length of the listening interval on the grouped subscriber stations, and
   the message transmitter reports the listening interval.

7. The power saving mode control system of claim 6, wherein the listening interval is established within the sleep interval.

8. A power saving mode control method in a wireless portable network system, comprising:
   receiving a sleep mode request message from a subscriber station;
   determining a minimum sleep interval and a maximum sleep interval of the subscriber station;
   determining a sleep mode enter time based on the minimum sleep interval and the maximum sleep interval so that the listening interval of the subscriber station which has requested the sleep mode may be aligned and grouped with listening intervals of other subscriber stations; and
   transmitting a sleep mode reply message including the minimum sleep interval, the maximum sleep interval, and the sleep mode enter time,
   wherein
   the minimum sleep interval is determined based on the minimum sleep interval requested by the subscriber station; and
   the sleep mode enter frame is determined to be a time when a remainder obtained by dividing a frame number of said frame by a maximum sleep interval align window size managed by the system becomes the minimum sleep interval.

9. The power saving mode control method of claim 8, wherein the maximum sleep interval is determined based on the interval of periodic traffic.

10. The power saving mode control method of claim 8, further comprising grouping and storing a plurality of subscriber stations switched to the listening interval at the same time.

11. The method of claim 8 further; comprising:
    switching the subscriber station to the sleep mode for receiving no traffic;
    exponentially increasing a sleep interval during the sleep mode;
    maintaining the sleep interval during a predefined maximum sleep interval when the sleep interval reaches the predefined maximum sleep interval;
    checking whether traffic during the listening interval, is transmitted to grouped subscriber stations during the sleep interval.

12. The method of claim 11, further comprising transmitting sleep indicator with different parameter values to the grouped subscriber stations according to results of said checking.

13. The method of claim 12, wherein the traffic indicator is transmitted in physical layer messages.

14. The method of claim 12, further comprising:
    allowing the grouped subscriber stations to maintain the sleep mode during the subsequent sleep interval when receiving the traffic indicator field having a parameter value reporting that no traffic is transmitted; and allowing the grouped subscriber stations to search for a subscriber station identifier corresponding to the traffic when receiving the traffic indicator having a parameter value reporting that traffic is transmitted.

15. The method of claim 14, further comprising: switching the subscriber station to an awake state and receiving the traffic buffered to the base station when the subscriber station identifier corresponding to the subscriber station is found.

* * * * *